(12) United States Patent
Fujii

(10) Patent No.: US 9,409,453 B2
(45) Date of Patent: Aug. 9, 2016

(54) TIRE STATE JUDGING DEVICE

(75) Inventor: Daigo Fujii, Susono (JP)

(73) Assignee: TOYOTA JIDOSHA KABUSHISKI KAISHA, Toyota-shi (JP)

( * ) Notice: Subject to any disclaimer, the term of this patent is extended or adjusted under 35 U.S.C. 154(b) by 157 days.

(21) Appl. No.: 13/578,069

(22) PCT Filed: Feb. 10, 2011

(86) PCT No.: PCT/JP2011/052932
§ 371 (c)(1),
(2), (4) Date: Aug. 9, 2012

(87) PCT Pub. No.: WO2011/099579
PCT Pub. Date: Aug. 18, 2011

(65) Prior Publication Data
US 2012/0310475 A1    Dec. 6, 2012

(30) Foreign Application Priority Data
Feb. 12, 2010    (JP) ................................. 2010-029413

(51) Int. Cl.
*B60C 23/06*    (2006.01)
*G01M 17/02*    (2006.01)

(52) U.S. Cl.
CPC ........... *B60C 23/062* (2013.01); *G01M 17/021* (2013.01)

(58) Field of Classification Search
None
See application file for complete search history.

(56) References Cited

U.S. PATENT DOCUMENTS

| | | | |
|---|---|---|---|
| 5,497,657 A * | 3/1996 | Taguchi et al. | 73/146.2 |
| 6,092,028 A * | 7/2000 | Naito et al. | 702/47 |
| 6,668,637 B2 * | 12/2003 | Ono et al. | 73/146.5 |
| 2002/0059826 A1* | 5/2002 | Ono et al. | 73/146.5 |
| 2009/0105921 A1 | 4/2009 | Hanatsuka et al. | |

FOREIGN PATENT DOCUMENTS

| | | | |
|---|---|---|---|
| JP | 61 56546 | 4/1986 | |
| JP | 5 133831 | 5/1993 | |
| JP | 6 297923 | 10/1994 | |
| JP | 2002 172920 | 6/2002 | |
| JP | 2003-154828 A | 5/2003 | |
| JP | 2003154828 A * | 5/2003 | ............. B60C 23/06 |
| JP | 2005 164337 | 6/2005 | |
| JP | 2009-513945 A | 4/2009 | |
| WO | 2006 135090 | 12/2006 | |

OTHER PUBLICATIONS

International Search Report Issued May 24, 2011 in PCT/JP11/52932 Filed Feb. 10, 2011.

* cited by examiner

*Primary Examiner* — Redhwan K Mawari
*Assistant Examiner* — Edward Torchinsky
(74) *Attorney, Agent, or Firm* — Oblon, McClelland, Maier & Neustadt, L.L.P

(57) ABSTRACT

A tire state judging device includes wheel speed sensors configured to detect rotational speeds of tires, and a control unit configured to perform frequency-analysis of detection results of the wheel speed sensors to detect a frequency of a valley part of an output, and calculate an air pressure of the tire from the detected frequency of the valley part. According to this, the tire state judging device has an effect that this can detect a state of the tire irrespective of a state of a road surface.

12 Claims, 8 Drawing Sheets

TIRE STATE JUDGING DEVICE

FIELD

The present invention relates to a tire state judging device that judges a state of a tire provided on a vehicle.

BACKGROUND

A method of judging the state of the tire provided on the vehicle, specifically, a method of measuring an air pressure in the tire includes a method of measuring by providing a measurement instrument on an air intake. There also is a device, which judges the air pressure of the tire without directly detecting the air pressure of the tire. For example, Patent Literature 1 discloses a measurement device provided on a road surface to measure the air pressure of the tire, which passes over a tire receiving plate. However, it is required to pass over a dedicated device for measurement of the air pressure in the device disclosed in Patent Literature 1.

On the other hand, Patent Literature 2 discloses a tire air pressure estimating device composed of a wheel speed sensor, road surface frictional state estimating means, which estimates a frictional state estimated value indicating a frictional state between the tire and the road surface from a wheel speed detected by the wheel speed sensor, tire air pressure estimating means, which estimates decrease in the air pressure of the tire based on the frictional state estimated value estimated by the road surface frictional state estimating means, and displaying means, which displays decrease in the estimated tire air pressure.

CITATION LIST

Patent Literature

Patent Literature 1: Japanese Utility Model Application Laid-open No. S61-056546
Patent Literature 2: Japanese Patent Application Laid-open No. 2002-172920

SUMMARY

Technical Problem

It is possible to measure the state of the tire by using the device disclosed in Patent Literature 2 without arranging a specific measurement device on the road surface. According to this, the state of the tire of the vehicle, which travels on an optional road surface, may be detected. Herein, the device disclosed in Patent Literature 2 estimates a state of the road surface on which the vehicle travels, so that when an estimation result of the road surface state (frictional estimated value) deviates from an actual road surface state, a measurement result of the tire air pressure also deviates. Therefore, it is required to estimate the road surface state at high accuracy in order to measure the tire air pressure at high accuracy. However, since the state of the road surface changes depending on a position in the same paved road, it is difficult to measure the same at high accuracy during travel.

The present invention is achieved in view of the above-description and an object thereof is to provide the tire state judging device capable of detecting the state of the tire irrespective of the state of the road surface.

Solution to Problem

In order to solve the above mentioned problem and achieve the object, a tire state judging device according to the present invention includes a wheel speed sensor configured to detect a rotational speed of a tire; and a control unit configured to perform frequency-analysis of a detection result of the wheel speed sensor to detect a frequency of a valley part of an output, and calculate an air pressure of the tire from the detected frequency of the valley part.

Here, it is preferable that the control unit performs the frequency-analysis of a low-frequency component of the detection result of the wheel speed sensor to calculate a vehicle speed, calculates a ground contact length from which a vehicle speed component is removed based on the vehicle speed and a result of the frequency-analysis of a high-frequency component of the detection result of the wheel speed sensor, and calculates the air pressure of the tire based on the ground contact length.

Further, it is preferable that the control unit determines a frequency region of a candidate of the valley part based on the vehicle speed.

Further, it is preferable that the control unit calculates the air pressure at set time intervals.

Further, it is preferable to further include an informing unit configured to give information of a state of the tire, wherein the control unit preferably judges the state of the tire based on the calculated air pressure and gives the information by the informing unit when the state of the tire becomes a predetermined state.

Further, it is preferable that the control unit outputs a warning from the informing unit when judging that the air pressure is not higher than a threshold value.

Advantageous Effects of Invention

The tire state judging device according to the present invention has an effect that the tire state judging device can detect the state of the tire irrespective of the state of the road surface.

DESCRIPTION OF EMBODIMENTS

Hereinafter, the present invention is described in detail with reference to the drawings. Meanwhile, the present invention is not limited by an embodiment for carrying out the invention (hereinafter, referred to as the embodiment) to be described below. Components in the following embodiment include the component easily conceived of by one skilled in the art and a substantially identical component, a so-called equivalent. Further, the components disclosed in the following embodiment may be appropriately combined with each other. Hereinafter, the embodiment of a tire state judging device according to the present invention is described in detail with reference to the drawings. Meanwhile, the invention is not limited by the embodiment.

[Embodiments]

Figure 1:
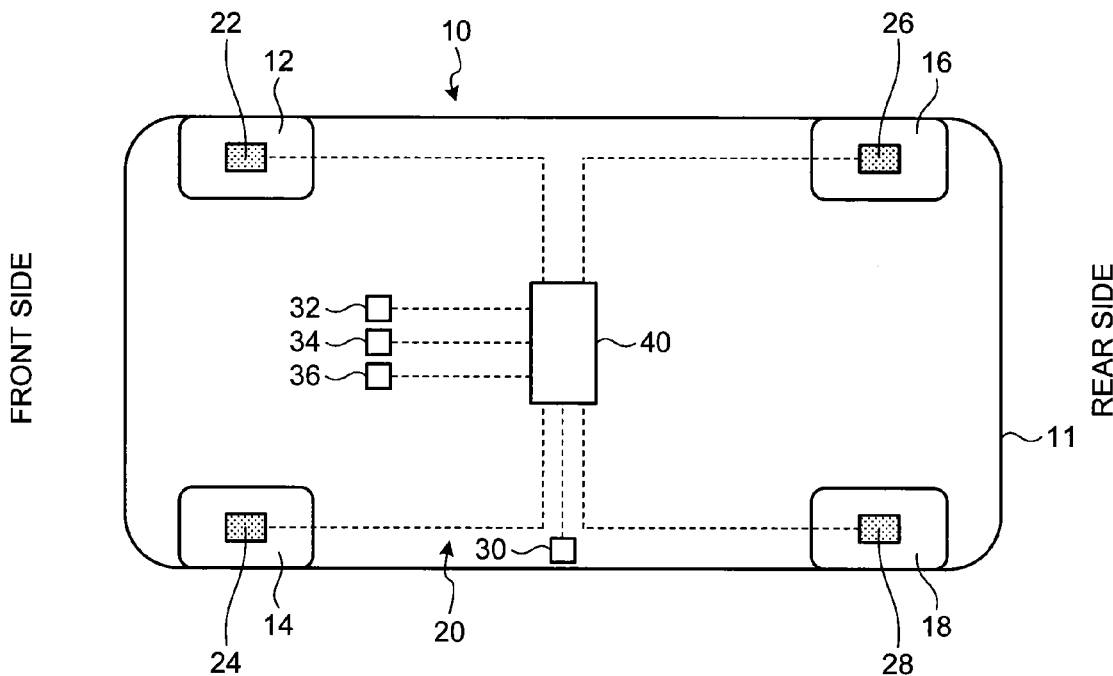
FIG. 1 is a schematic diagram illustrating a schematic configuration of a vehicle provided with a tire state judging device.
Figure 2:
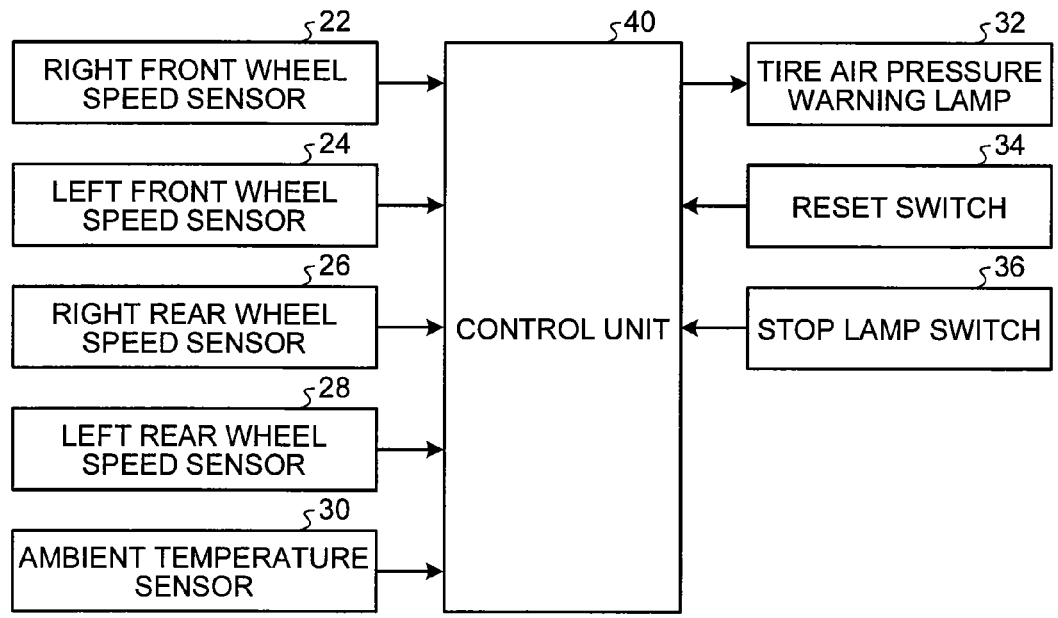
FIG. 2 is a block diagram illustrating a schematic configuration of the tire state judging device.

FIG. 1 is a schematic diagram illustrating a schematic configuration of a vehicle provided with a tire state judging device. FIG. 2 is a block diagram illustrating a schematic configuration of the tire state judging device. As illustrated in FIG. 1, a vehicle 10 includes a vehicle body 11, a right front tire 12, a left front tire 14, a right rear tire 16, a left rear tire 18, and a tire state judging device 20. Meanwhile, although not illustrated, the vehicle 10 is provided with various configurations necessary as the vehicle such as a driving source, a power transmitting unit, an operating unit, and a seat in addition to the above-described configuration.

The vehicle body 11 is a housing of the vehicle 10, a so-called body. The driving source, the power transmitting unit, the operating unit, the seat and the like are provided in the vehicle body 11.

The right front tire 12, the left front tire 14, the right rear tire 16, and the left rear tire 18 are arranged on four sides of the vehicle body 11 and are in contact with a road surface. The right front tire 12, the left front tire 14, the right rear tire 16, and the left rear tire 18 are rotated by the driving source and the power transmitting unit, thereby transmitting driving force to the road surface to move the vehicle body 11 relative to the road surface.

As illustrated in FIGS. 1 and 2, the tire state judging device 20 includes a right front wheel speed sensor 22, a left front wheel speed sensor 24, a right rear wheel speed sensor 26, a left rear wheel speed sensor 28, an ambient temperature sensor 30, a tire air pressure warning lamp 32, a reset switch 34, a stop lamp switch 36, and a control unit 40.

The right front wheel speed sensor 22 is a detector, which detects a wheel speed (rotational speed) of the right front tire 12. The left front wheel speed sensor 24 is the detector, which detects the wheel speed (rotational speed) of the left front tire 14. The right rear wheel speed sensor 26 is the detector, which detects the wheel speed (rotational speed) of the right rear tire 16. The left rear wheel speed sensor 28 is the detector, which detects the wheel speed (rotational speed) of the left rear tire 18. Meanwhile, each wheel speed sensor is arranged on an axle and the like of a corresponding tire. Also, a semiconductor wheel speed sensor can be used as the wheel speed sensor. Each wheel speed sensor transmits data of the detected wheel speed to the control unit 40.

The ambient temperature sensor 30 is a detector, which detects a temperature of an atmosphere outside the vehicle body 11. The ambient temperature sensor 30 transmits information of the detected temperature to the control unit 40. Various types of temperature detectors can be used as the ambient temperature sensor 30. The information detected by the ambient temperature sensor 30 may also be used for air conditioning control of the vehicle 10.

The tire air pressure warning lamp 32 is the lamp, which gives notice of abnormality of an air pressure of the tire, and the control unit 40 switches between turn-on and turn-off thereof. Meanwhile, although the tire air pressure warning lamp 32 may be arranged in various positions of the vehicle body 11, this is preferably arranged in a position easily seen by a driver, for example, in a dashboard.

The reset switch 34 is the switch, which inputs an instruction of setting of judgment criteria of a tire state. When the reset switch 34 is turned on at the time of initial setting such as at the time of tire change, this transmits an input instruction to the control unit 40. When the control unit 40 detects that the reset switch is turned on, this sets a setting condition again. Meanwhile, it is also possible that the reset switch 34 does not transmit a signal to the control unit 40 and the control unit 40 detects a state of the reset switch 34 at regular time intervals or at all times.

The stop lamp switch 36 is the switch, which switches between inhibition and allowance of the judgment of the tire state at the time of braking. That is to say, the stop lamp switch 36 is switched between a state in which an inhibiting mode in which the judgment of the tire state is inhibited at the time of braking is selected and a state in which a judgment executing mode in which the judgment of the tire state is not inhibited at the time of braking (that is to say, the tire state is judged at the time of braking) is selected by operation of a user (switching operation). The control unit 40 detects a state of the stop lamp switch 36, that is to say, the mode selected by the user out of the inhibiting mode and the judgment executing mode, and performs control based on a detection result.

The control unit 40 is provided with a calculation function to calculate the tire state to judge based on the detection result detected by each wheel speed sensor and/or the ambient temperature sensor 30. Also, the control unit 40 sets a detection condition based on the instruction input to the reset switch 34 and the stop lamp switch 36, that is to say, based on the state of each switch. Specifically, the control unit 40 is provided with a processing function (program) to calculate a ground contact length of the tire, the processing function (program) to estimate an inner pressure, the processing function (program) to output a warning and the like to perform various processes. Also, the control unit 40 switches between the turn-on and the turn-off of the tire air pressure warning lamp 32 based on a judgment result of the tire state.

Figure 3:
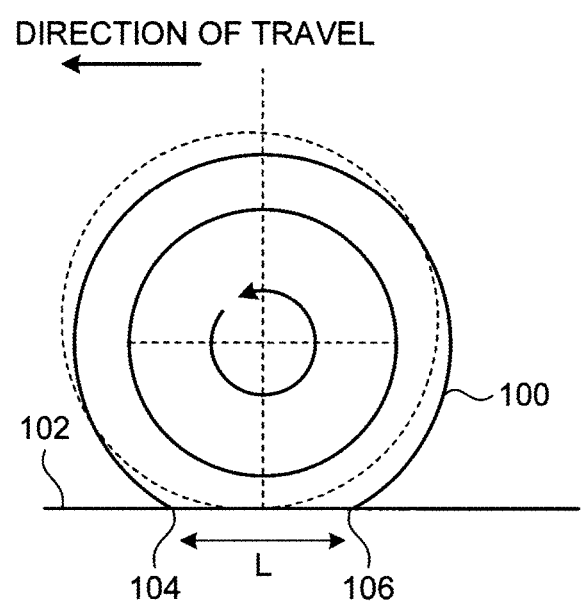
FIG. 3 is a schematic diagram illustrating an example of a tire during travel.

More specifically, the control unit 40 calculates the ground contact length based on the detection result detected by each wheel speed sensor and/or the ambient temperature sensor 30. The control unit 40 judges the state of the tire based on the ground contact length or the air pressure in the tire calculated from the ground contact length. Herein, FIG. 3 is a schematic diagram illustrating an example of the tire during travel. Meanwhile, the tire in a state in which weight is not applied is indicated by a dotted line in FIG. 3 for reference. Herein, as illustrated in FIG. 3, a ground contact length L of the tire is the length of a portion at which a tire 100 is brought into contact with a road surface 102 during the travel. More specifically, when the vehicle travels from right to left in the drawing (direction of travel in the drawing), the tire 100 rotates in a counterclockwise direction. At that time, if a front end of a ground contact portion in the direction of travel of the tire 100 is made a ground contact starting point 104 and a rear end of the ground contact portion in the direction of travel is made a ground contact ending point 106, the ground contact length L is a distance from the ground contact starting point 104 to the ground contact ending point 106. Meanwhile, a method of calculating the ground contact length L from each wheel speed sensor and the like is hereinafter described together with control operation of the tire state judging device 20.

Figure 4:
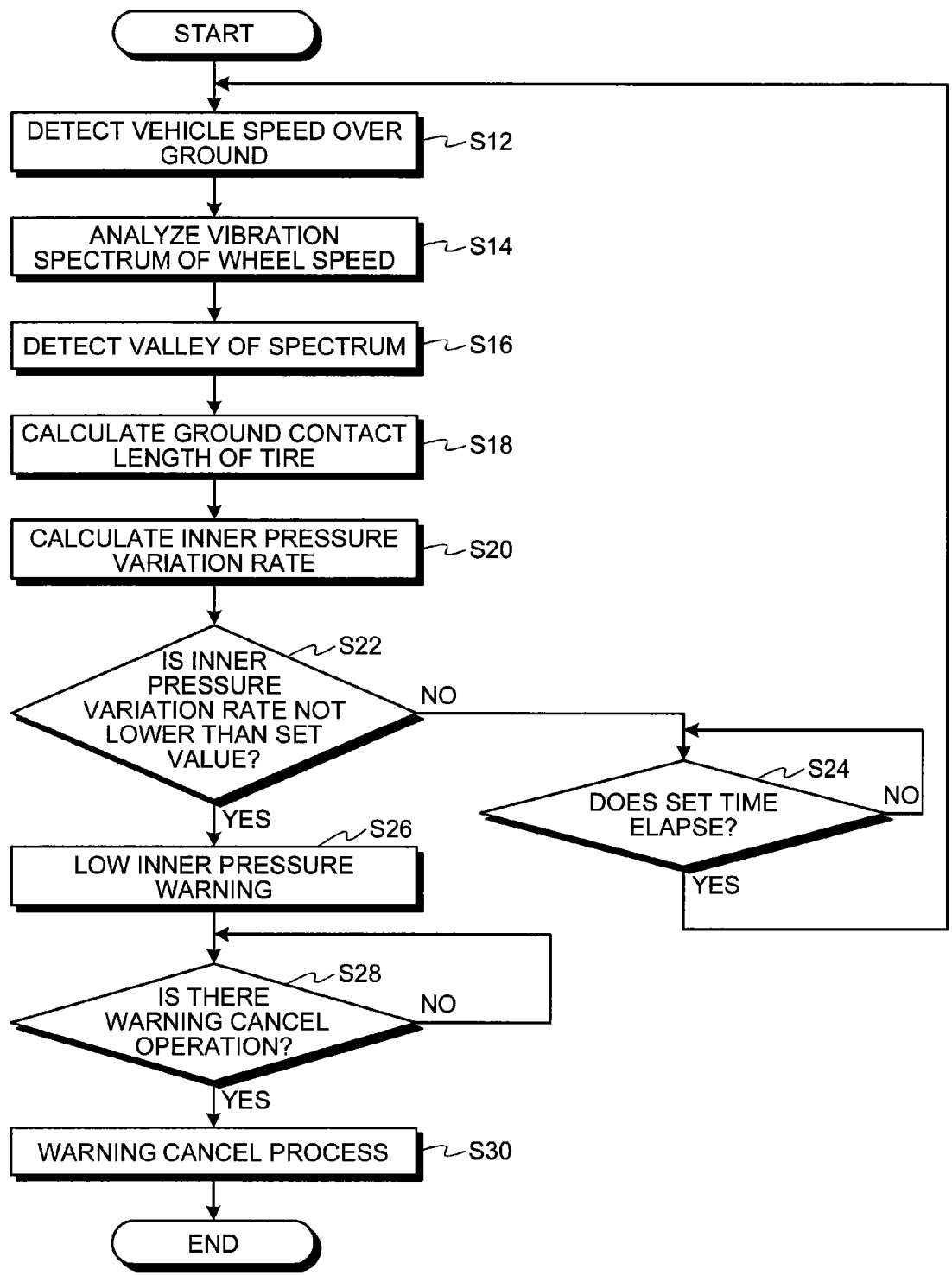
FIG. 4 is a flow diagram illustrating processing operation of the tire state judging device.

Next, the control operation of the tire state judging device 20 is described with reference to FIG. 4. Herein, FIG. 4 is a flow diagram illustrating processing operation of the tire state judging device. Meanwhile, a fitted tire rolling radius value re [m], a low-frequency threshold value LF [Hz], a high-frequency threshold value HF [Hz], a standard ground contact length set map value $L_f$ [m], a threshold value of inner pressure decreasing rate warning wIP [dB], and a measurement cycle period pt [s] are stored in the control unit 40 as initial set values. Meanwhile, the control unit 40 separately performs judgment of the state of the tire for each tire. Hereinafter, the control operation for one tire is described.

First, the control unit 40 of the tire state judging device 20 detects a vehicle speed over the ground at step S12. That is to say, the control unit 40 detects (calculates) the vehicle speed over the ground from information of the detection result transmitted from the wheel speed sensor of a target of the judgment of the state of the tire out of the right front wheel speed sensor 22, the left front wheel speed sensor 24, the right rear wheel speed sensor 26, and the left rear wheel speed sensor 28. Specifically, the control unit 40 acquires a wheel rotational speed pulse from the wheel speed sensor as the detection result and calculates a wheel rotational angular speed value $\omega$ [rad/s] from the acquired wheel rotational speed pulse. Meanwhile, the wheel rotational angular speed value $\omega$ can be calculated based on the detection result of the wheel rotational speed pulse and a number of times of pulse generation per rotation set in advance.

Further, the control unit 40 calculates an axel translational speed value over the ground v [m/s] by multiplying the calculated wheel rotational angular speed value $\omega$ by the fitted tire rolling radius value re. That is to say, the axel translational speed value over the ground (vehicle speed over the ground) v is calculated by performing calculation of "$\omega \times re = v$". Meanwhile, the fitted tire rolling radius value re is the radius of the tire during the travel, that is to say, the radius of the tire obtained by taking deformation of the tire by its own weight, deformation thereof by the travel and the like into account. Meanwhile, a value calculated by measurement in advance and stored and a value calculated by taking the deformation during the travel and the like into account may be used as the fitted tire rolling radius value re. That is to say, a value stored in a map may be read based on a condition as the fitted tire rolling radius value re or this may be calculated each time based on the condition. Meanwhile, the fitted tire rolling radius value re may be one value irrespective of a travel condition.

After the control unit 40 detects the vehicle speed over the ground v at step S12, this analyzes a vibration spectrum of the wheel speed at step S14. Specifically, the control unit 40 divides the vehicle speed over the ground v detected at step S12 into frequency bands using two band pass filters. That is to say, the control unit 40 extracts a component not higher than the threshold value LF of the vehicle speed over the ground v by allowing the frequency not higher than the low-frequency threshold value LF [Hz] to pass (without allowing the frequency higher than the low-frequency threshold value to pass) and extracting only a part of the frequency components by the band pass filter. Also, the control unit 40 extracts the component not lower than the threshold value HF of the vehicle speed over the ground v by allowing the frequency not lower than the high-frequency threshold value HF [Hz] to pass (without allowing the frequency lower than the high-frequency threshold value to pass) and extracting only a part of the frequency components by the band pass filter. Meanwhile, the component not higher than the threshold value LF and the component not lower than the threshold value HF are separately extracted and separately processed. Herein, the low-frequency threshold value LF is the threshold value for extracting the component necessary for calculating a vehicle body speed to be described later and the high-frequency threshold value HF is the threshold value for extracting the component necessary for calculating vibration of the wheel speed to be described later. Meanwhile, relationship between the low-frequency threshold value LF and the high-frequency threshold value HF is not especially limited and they may be values separated from each other by a constant frequency and the low-frequency threshold value LF may be made higher than the high-frequency threshold value HF.

After the control unit 40 analyzes the spectrum at step S14, this next detects a valley part of the spectrum from the detected spectrum at step S16. Specifically, the control unit 40 first calculates a vehicle body speed over the ground U from the component not higher than the threshold value LF of the vehicle speed over the ground v. After the control unit 40 calculates the vehicle body speed over the ground U, this calculates a frequency at a center of search calculated (search center frequency) F. Herein, the search center frequency F is calculated by (vehicle body speed over the ground U)/(standard ground contact length set map value $L_f$). It is possible to narrow the band of the frequency at which an output due to the ground contact length is generated by dividing the vehicle body speed over the ground U by the standard ground contact length set map value $L_f$. Meanwhile, the standard ground contact length set map value $L_f$ is the ground contact length under a reference condition (standard state). The standard ground contact length set map value $L_f$ has the map and a selected value may be changed according to the condition or the same value may always be selected.

Also, the control unit 40 makes the component not lower than the threshold value HF of the vehicle speed over the ground v a wheel speed over the ground V. Herein, the wheel speed over the ground V includes a component of the vibration of the wheel during the travel. The control unit 40 performs frequency-analysis of the wheel speed over the ground V. That is to say, the control unit 40 calculates the output for each frequency (vibration power $V^2$ [$(m/s)^2$]) and calculates relationship between the frequency and the output. After the control unit 40 calculates the relationship between the frequency and the output, this detects the frequency at which a waveform has a valley shape in the narrowed frequency band. Meanwhile, the output of the valley part (magnitude of the vibration power) becomes the output near the output generated when the vehicle travels on a smooth road surface (without bump). Therefore, although the valley part is judged from a shape of the spectrum in this embodiment, it is also possible to judge whether it is the valley part based on the magnitude of the output in addition to the shape of the spectrum calculated. In this manner, it becomes possible to judge the valley part more correctly by judging whether it is the valley part by the shape and the magnitude of the output.

After the control unit 40 detects the valley of the spectrum at step S16, this calculates the ground contact length of the tire at step S18. Specifically, a ground contact length L' is calculated by dividing the vehicle body speed over the ground U by the calculated frequency. Meanwhile, it is also possible to convert a frequency axis of the relationship between the calculated frequency and the output to an axis of the ground contact length (1/L in this case) and calculate the ground length of the valley of the output based on relationship between the converted ground contact length and the output, thereby calculating the ground contact length L'.

When the control unit 40 calculates the ground contact length L' of the tire at step S18, this calculates an inner pressure variation rate dIP at step S20. Herein, it is possible to calculate the inner pressure variation rate dIP by dividing the ground contact length L' by the ground contact length $L_f$, that is to say, by dIP=L'/$L_f$. When the control unit 40 calculates the inner pressure variation rate dIP at step S20, this judges whether the inner pressure variation rate is not lower than a set value at step S22. Specifically, the control unit 40 judges whether the inner pressure variation rate dIP is not lower than the threshold value of inner pressure decreasing rate warning wIP, that is to say, whether wIP≤dIP is satisfied. Herein, the threshold value of inner pressure decreasing rate warning wIP is the threshold value set in advance as described above and can be various values according to an intended purpose.

When the control unit 40 judges that the inner pressure variation rate dIP is lower than the threshold value of inner pressure decreasing rate warning wIP (No), that is to say, that wIP>dIP is satisfied at step S22, this judges whether a set time elapses, that is to say, whether an elapsed time is not shorter than the set time at step S24. Herein, the set time is a measurement cycle period pt. Also, the elapsed time may be set to a time elapsed from a time point at which a just previous inner pressure variation rate is calculated or may be set to the time elapsed from a time point at which the vehicle speed over the ground v is detected.

When the control unit 40 judges that the set time does not elapse (No) at step S24, this shifts to step S24. That is to say, the control unit 40 repeats the judgment at step S24 until the set time elapses. Also, when the control unit 40 judges that the set time elapses (Yes) at step S24, this shifts to step S12. In this manner, the control unit 40 calculates variation in the inner pressure (air pressure) of the tire each time the set time elapses.

Also, when the control unit 40 judges that the inner pressure variation rate dIP is not lower than the threshold value of inner pressure decreasing rate warning wIP (Yes), that is to say, that wIP≤dIP is satisfied at step S22, this issues a low inner pressure warning at step S26. Specifically, the control unit 40 turns on the tire air pressure warning lamp 32. According to this, the tire state judging device 20 can notify the user of occurrence of the abnormality in the tire air pressure.

When the control unit 40 outputs the warning at step S26, this judges whether there is warning cancel operation (whether this is input) at step S28. Herein, the warning cancel operation includes change operation of the tire, press-down of the reset switch 34 and the like. When the control unit 40 judges that there is no warning cancel operation (No) at step S28, this shifts to step S28. That is to say, the control unit 40 repeats the judgment at step S28 until the cancel operation is input. Also, when the control unit 40 judges that there is the warning cancel operation (Yes) at step S28, this performs a warning cancel process at step S30. In this embodiment, the control unit 40 turns off the tire air pressure warning lamp 32. The control unit 40 thereafter finishes the process.

Figure 5A:
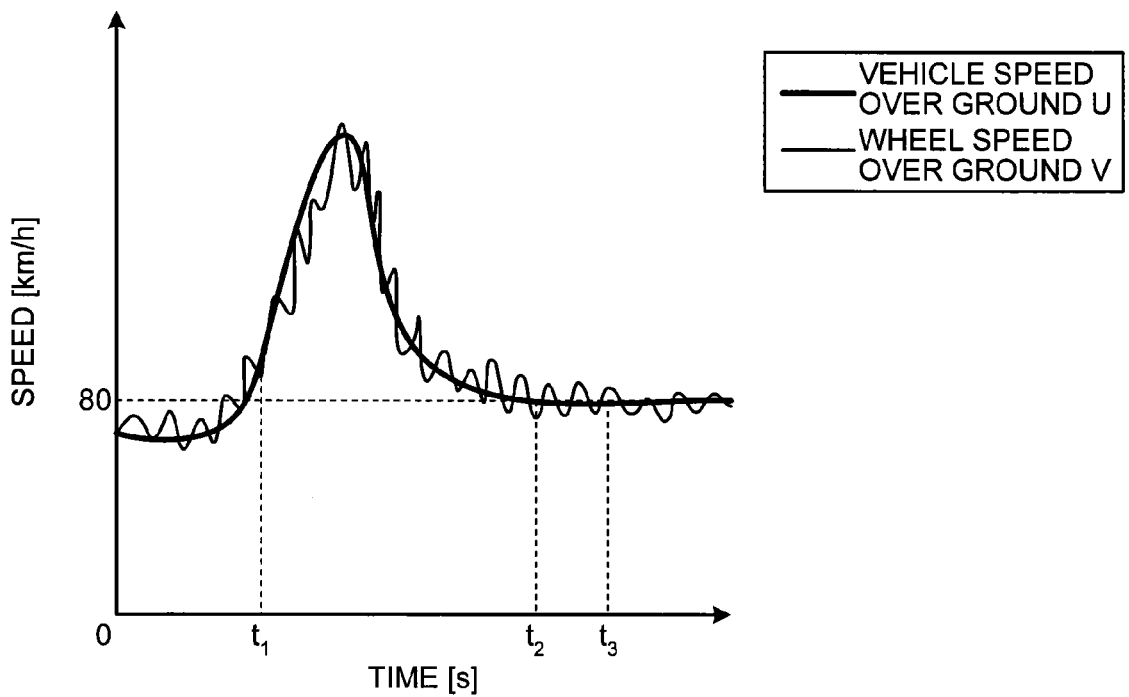
FIG. 5A is a graph illustrating relationship between a speed and a time.
Figure 5B:
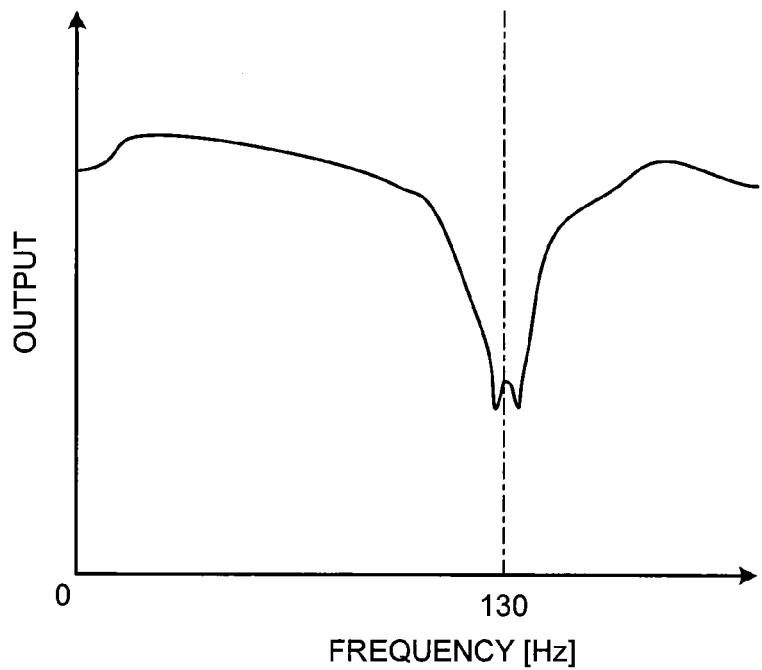
FIG. 5B is a graph illustrating relationship between an output and a frequency.
Figure 5C:
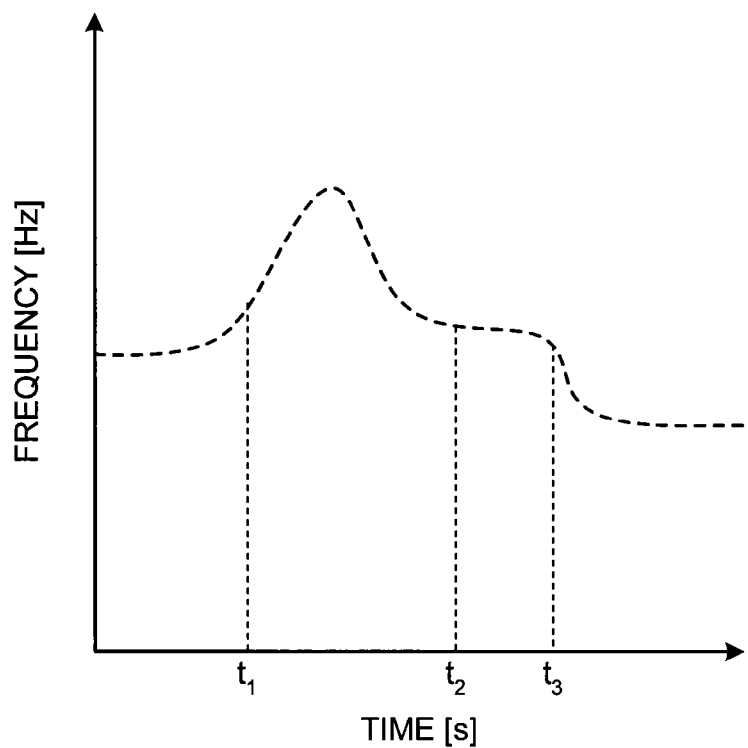
FIG. 5C is a graph illustrating relationship between the frequency and the time.
Figure 5D:
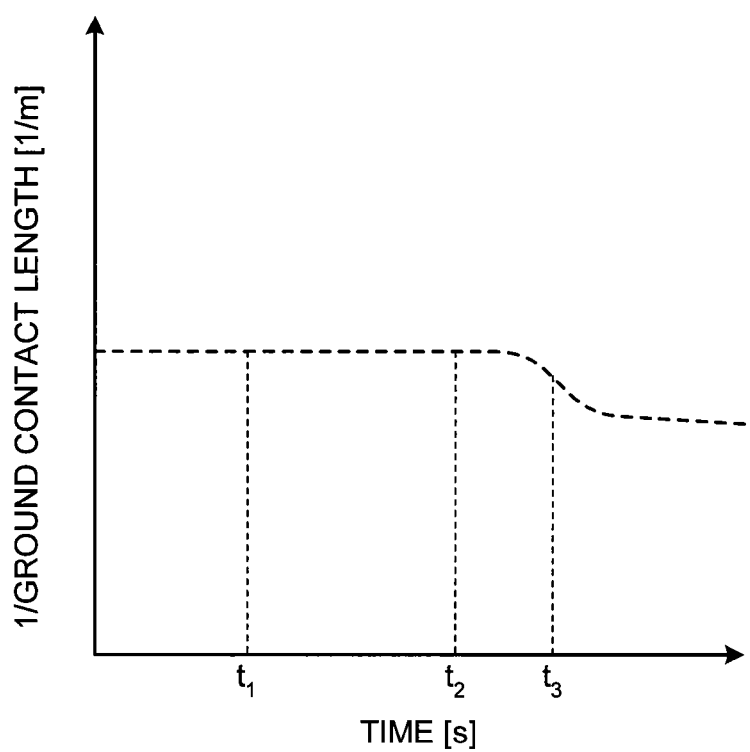
FIG. 5D is a graph illustrating relationship between a ground contact length and the time.

Next, the operation of the tire state judging device 20 is more specifically described with reference to FIGS. 5A to 5D, 6A to 6C, 7, and 8. First, relationship between an elapsed time, a measurement result, and a calculation result is described with reference to FIGS. 5A to 5D. Herein, FIG. 5A is a graph illustrating relationship between the speed and the time, FIG. 5B is a graph illustrating the relationship between the output and the frequency, FIG. 5C is a graph illustrating relationship between the frequency and the time, and FIG. 5D is a graph illustrating relationship between the ground contact length and the time. In FIG. 5A, the speed [km/h] and the time [s] are plotted along an axis of ordinate and an axis of abscissa, respectively. In FIG. 5B, the frequency [Hz] and the output are plotted along the axis of ordinate and the axis of abscissa, respectively. In FIG. 5C, the frequency [Hz] and the time [s] are plotted along the axis of ordinate and the axis of abscissa, respectively. In FIG. 5D, 1/ground contact length [1/m] and the time [s] are plotted along the axis of ordinate and the axis of abscissa, respectively. Meanwhile, the axes of abscissa in FIGS. 5A, 5C, and 5D are the same time axes.

First, as illustrated in FIG. 5A, the vehicle 10 travels at a constant speed, then accelerated in the vicinity of a time $t_1$ and thereafter decelerated, and travels at 80 km/h after a time $t_2$. In this case, the vehicle body speed over the ground U transits with the above-described change in speed. Also, as illustrated in FIG. 5A, the wheel speed over the ground V changes with vibration.

The tire state judging device 20 repeatedly performs the processing operation illustrated in FIG. 4 during the travel under the condition illustrated in FIG. 5A. For example, when the relationship between the output and the frequency is calculated for the measurement result of the wheel speed sensor at the time $t_2$, a state illustrated in FIG. 5B is obtained. Meanwhile, in output distribution illustrated in FIG. 5B, the valley part of the output is generated at 130 Hz. Meanwhile, the valley part of the output is generated due to the ground contact length of the tire as described above. Specifically, this is due to a ground contact time period of the tire, that is to say, a time taken from a time point at which an optional point of the tire passes the contact starting point to a time point at which this passes the ground contact ending point. That is to say, the frequency calculated from the time taken from the time point at which the optional point of the tire passes the ground contact starting point to the time point at which this passes the ground contact ending point becomes the valley part of the output. The tire state judging device 20 calculates the valley part for each time.

FIG. 5C is the graph obtained by plotting the time of the valley part for each time. As illustrated in FIG. 5C, the frequency of the valley part of the output changes in proportion to the speed from a time 0 to the time $t_2$. This is because the time taken from the time point at which the optional point of the tire passes the ground contact starting point to the time point at which this passes the ground contact ending point becomes shorter due to increase in rotational speed of the tire (wheel) even when the ground contact length is constant. Also, the inner pressure of the tire decreases at a time $t_3$ and the ground contact length increases in this embodiment. According to this, the time taken from the time point at which the optional point of the tire passes the ground contact starting point to the time point at which this passes the ground contact ending point increases, so that the frequency of the valley of the output drops. Specifically, after the time $t_3$, the frequency is at 104 Hz.

FIG. 5D is the graph obtained by removing an effect of variation in the vehicle body speed over the ground U from the graph illustrated in FIG. 5C and converting the axis of ordinate from the frequency to 1/ground contact length (that is to say, 1/L). Specifically, this is calculated by dividing the frequency by the speed at each time. That is to say, by dividing the frequency F by the vehicle body speed over the ground U by using relationship L=U/F, the axis of ordinate is set to F/U=1/L. According to this, it becomes possible to remove the effect of the change in the vehicle body speed over the ground U from the measurement result to detect only the change in the ground contact length. As illustrated in FIG. 5D, the calculated ground contact length (herein, 1/L) is constant until $t_3$ at which the inner pressure of the tire decreases, and when the inner pressure decreases, the ground contact length L increases, so that the 1/L decreases.

Herein, when the speed is 80 km/h and the frequency is 130 Hz, the ground contact length L can be calculated as (80/3.6)/130=0.17 m from the relationship L=U/F. Also, when the speed is 80 km/h and the frequency is 104 Hz, the ground contact length L can be calculated as (80/3.6)/140=0.21 m from the relationship L=U/F. Also, the air pressure of the tire can be calculated based on a ground contact length increasing rate. For example, in a case in which the air pressure of the tire is 230 kPa when the ground contact length L=0.17 m, if the ground contact length L=0.21 m, the ground contact length increasing rate IP=$L_t$/L'=0.17/0.21 and this is approximately 0.8. According to this, the air pressure can be calculated as 230×0.8=190 kPa. Meanwhile, it is also possible to calculate by further taking a weight of the vehicle and the like into account. Specifically, the larger the weight of the vehicle, the longer the ground contact length, and the smaller the weight of the vehicle, the shorter the ground contact length. It is possible to utilize this relationship or it is possible to calculate relationship between the ground contact length and the air pressure for each weight of the vehicle and switch the relationship to be used according to the weight of the vehicle.

In this manner, the tire state judging device 20 detects the valley of the output due to the ground contact length from a detection value of the wheel speed sensor and calculates the ground contact length from the frequency of the valley of the output, thereby calculating the air pressure in the tire. According to this, the tire state judging device 20 can calculate the air pressure of the tire without directly measuring the tire air pressure. The ground contact length of the tire does not change according to unevenness and a state (frictional coefficient) of the road surface on which the vehicle travels but changes according to a state of the vehicle such as the inner air pressure, the weight of the vehicle, and a travel speed. Therefore, the tire state judging device 20 may calculate the air pressure of the tire irrespective of the state of the road surface on which the vehicle travels. Therefore, need for estimating the state of the road surface on which the vehicle travels is eliminated, so that the measurement becomes easy. Also, a detection error of the state of the road surface is not generated, so that a measurement error can be made small.

Also, the tire state judging device 20 can calculate by using the detection result of the wheel speed sensor, so that it becomes possible to judge the tire state by using the wheel speed sensor generally provided on the vehicle without providing a new sensor and the like. According to this, a device configuration can be made simple.

Figure 6A:
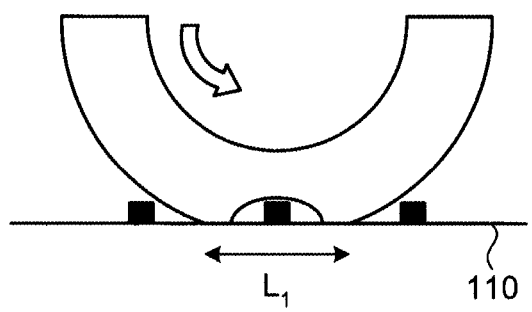
FIG. 6A is a schematic diagram illustrating another example of the tire during the travel.
Figure 6B:
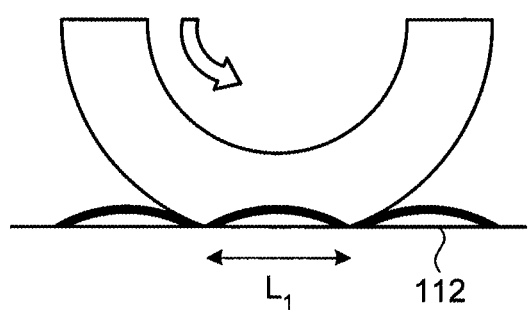
FIG. 6B is a schematic diagram illustrating another example of the tire during the travel.
Figure 6C:
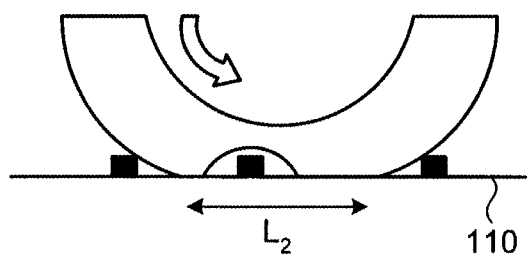
FIG. 6C is a schematic diagram illustrating another example of the tire during the travel.

Next, the tire state judging device 20 is more specifically described with reference to FIGS. 6A to 6C and 7. Herein, FIGS. 6A to 6C are schematic diagrams illustrating another example of the tire during the travel. First, in the tires illustrated in FIGS. 6A and 6B, the air pressure is the same and in the tire illustrated in FIG. 6C, the air pressure is lower than that of the tires illustrated in FIGS. 6A and 6B. Also, a road surface 110 illustrated in FIG. 6A and the road surface 110 illustrated in FIG. 6C are the same road surface and the road surface 110 illustrated in FIG. 6A and a road surface 112 illustrated in FIG. 6B are different road surfaces. That is to say, in FIGS. 6A and 6B, the road surfaces on which the vehicle travels are different and the tire in FIG. 6A and that in FIG. 6C have different air pressures of the tire. Meanwhile, since the air pressure is the same in the tire in FIG. 6A and the tire in FIG. 6B, the ground contact length $L_1$ is the same. Also, since the air pressure of the tire in FIG. 6C is lower than that of the tires in FIGS. 6A and 6B, a ground contact length $L_2$ becomes longer than the ground contact length $L_1$.

Figure 7:
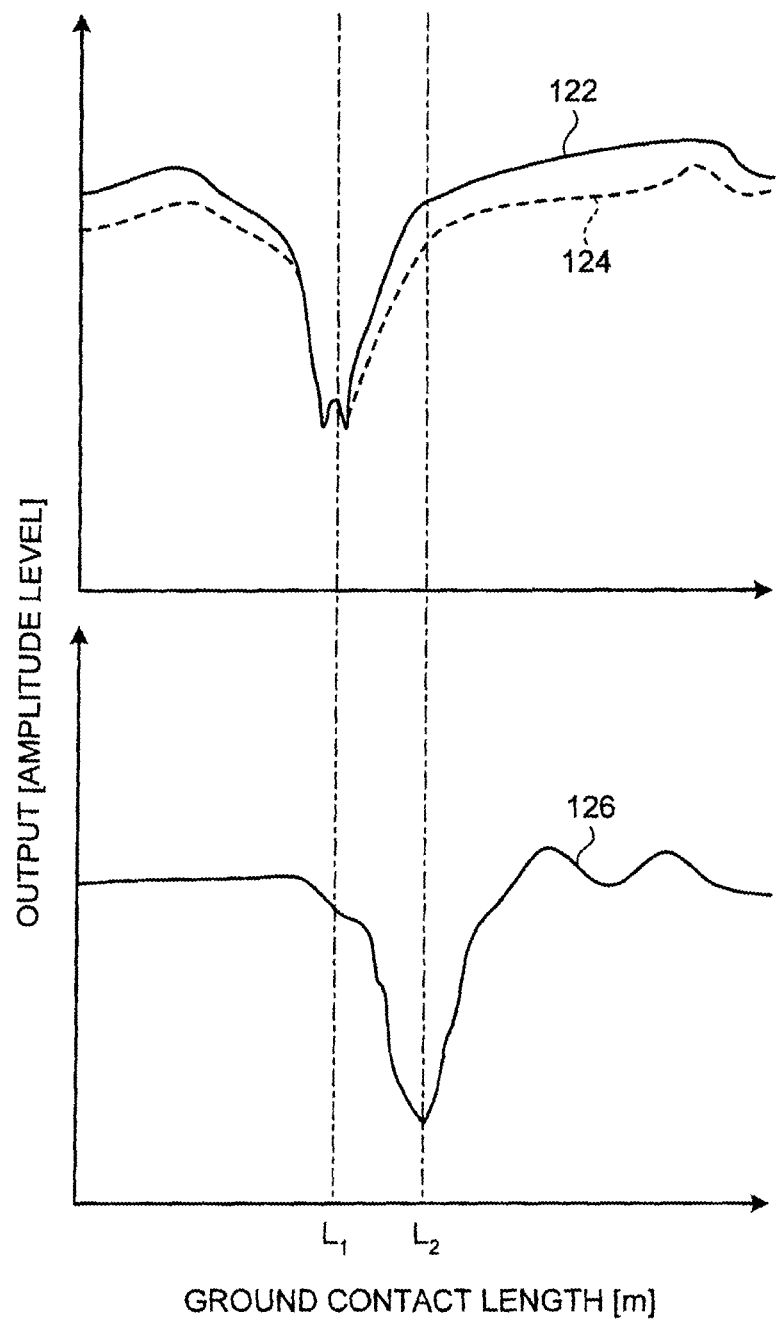
FIG. 7 is a graph illustrating relationship between an amplitude level and the ground contact length.

In this manner, the vehicle is allowed to travel on the road surface, and the relationship between the frequency and the output is calculated for each state illustrated in FIGS. 6A to 6C. Thereafter, the frequency is converted to the ground contact length and relationship between the calculated output and the ground contact length is illustrated in FIG. 7. Herein, FIG. 7 is a graph illustrating relationship between an amplitude level and the ground contact length. In FIG. 7, the output (amplitude level) and ground contact length [m] are plotted along the axis of ordinate and the axis of abscissa, respectively. Also, the graph in FIG. 7 indicates the detection results by dividing them into two with the common axis of abscissa. A measurement result 122 in FIG. 6A and a measurement result 124 in FIG. 6B are indicated in an upper graph and a measurement result 126 in FIG. 6C is indicated in a lower graph. As indicated by the measurement results 122 and 124 in FIG. 7, the output distribution differs between the case of the travel on the road surface 110 and the case of the travel on the road surface 112, the position of ground contact length of the valley of the output is the same position $L_1$. On the other hand, as indicated by the measurement results 122 and 126 in FIG. 7, even in the case of the travel on the same road surface 110, the valley part of the output are different positions $L_1$ and $L_2$ with the tires with different air pressures.

As described above, the tire state judging device 20 can calculate the ground contact length without estimating the road surface state, and since this can calculate the ground contact length, this can calculate the air pressure of the tire. According to this, the state of the tire can be judged. That is to say, as illustrated in the upper view in FIG. 7, everything but the position of the valley of the output changes with different road surface state, a variety of calculations are required when calculating the air pressure of the tire by using a property other than the frequency due to the ground contact length of the tire. On the other hand, the tire state judging device 20 can judge the state of the tire without estimating the road surface state, so that this can easily judge the state of the tire.

Figure 8:
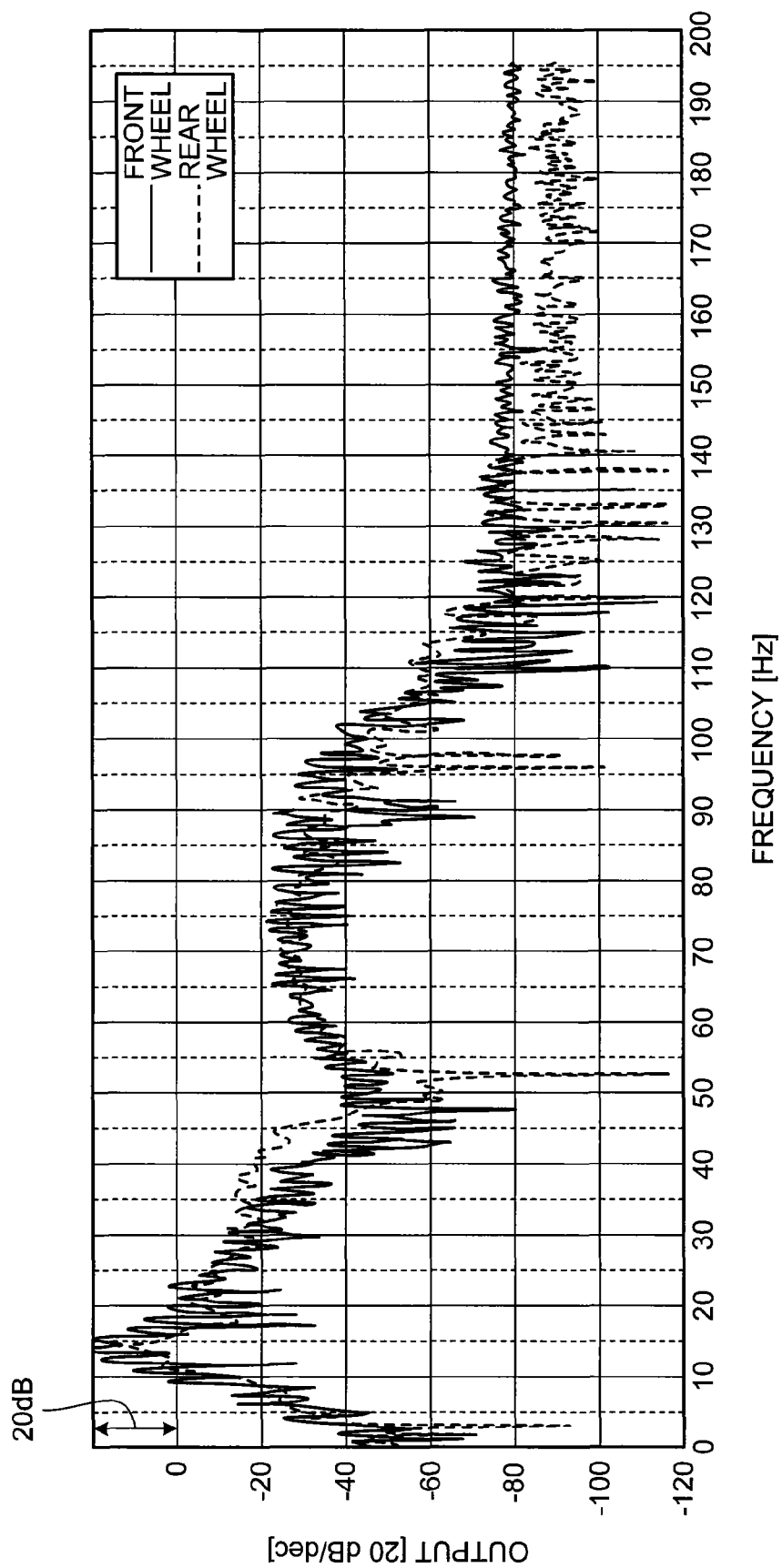
FIG. 8 is a graph illustrating relationship between the output and the frequency.

Next, it is described with an actually measured example with reference to FIG. 8. Herein, FIG. 8 is a graph illustrating the relationship between the output and the frequency. In FIG. 8, the frequency [Hz] and the output [20 dB/dec] are plotted along the axis of abscissa and the axis of ordinate, respectively. FIG. 8 also illustrates results of the frequency-analysis of the detection result of the wheel speed sensor of the front wheel of the vehicle and the detection result of the wheel speed sensor of the rear wheel. Meanwhile, it is measured by allowing the vehicle to travel at 40 km/h in this measurement.

As illustrated in FIG. 8, the valley of the output is generated at the frequency of 47.9 Hz for the front wheel and the valley of the output is generated at the frequency of 53.1 kHz for the rear wheel. Also, as illustrated in FIG. 8, the detection results have the output different from that at another frequency, that is to say, the outputs are easily distinguished.

Meanwhile, the ground contact length of the front wheel is calculated to be (40/3.6)/47.9=0.231 m and the ground contact length of the rear wheel is calculated to be (40/3.6)/53.1=0.209 m from the above-described detection results. Herein, the weight (load) of the front wheel is smaller than that of the rear wheel, so that the ground contact length thereof becomes shorter. According to this, it is understood that an actual ground contact length can be measured from the valley of the output.

Although the warning is output by turning on the tire air pressure warning lamp 32 in the above-described embodiment, a method of outputting the warning is not limited thereto. For example, it is possible to display the same on a screen as character information or output the same by sound.

Meanwhile, although the variation in the air pressure of the tire is judged by comparing the ground contact length with the reference ground contact length in the above-described embodiment, there is no limitation and it is also possible to calculate the air pressure of the tire from the ground contact length and compare the calculated air pressure with the reference air pressure.

Although the warning is issued when the air pressure of the tire decreases in the above-described embodiment, it is also possible to set an upper limit in the air pressure of the tire and issue the warning also when the air pressure of the tire becomes larger than the upper limit.

INDUSTRIAL APPLICABILITY

As described above, the tire state judging device according to the present invention is useful for detecting the state of the tire provided on the vehicle.

REFERENCE SIGNS LIST

10 VEHICLE
12 RIGHT FRONT TIRE
14 LEFT FRONT TIRE
16 RIGHT REAR TIRE
18 LEFT REAR TIRE
20 TIRE STATE JUDGING DEVICE
22 RIGHT FRONT WHEEL SPEED SENSOR
24 LEFT FRONT WHEEL SPEED SENSOR
26 RIGHT REAR WHEEL SPEED SENSOR
28 LEFT REAR WHEEL SPEED SENSOR
30 AMBIENT TEMPERATURE SENSOR
32 TIRE AIR PRESSURE WARNING LAMP
34 RESET SWITCH
36 STOP LAMP SWITCH
40 CONTROL UNIT

The invention claimed is:

1. A tire state judging device comprising:
a wheel speed sensor configured to detect a rotational speed of a tire of which an air pressure is calculated; and
a control unit configured to perform frequency-analysis of a detection result of only the wheel speed sensor to detect a frequency at a bottom of a valley part of an output, the frequency corresponding to a time taken for a point of the tire to move from a ground contact starting point to a ground contact ending point, and calculate the air pressure of the tire corresponding to the detection result from the detected frequency at the bottom of the valley part and a vehicle speed,
wherein the control unit performs the frequency-analysis of a low-frequency component of the detection result of the wheel speed sensor to calculate a vehicle body speed over a around, determines a frequency region of a candidate of the valley part based on the vehicle body speed over the ground, performs the frequency-analysis of a high-frequency component of the detection result of the wheel speed sensor to calculate a relationship between a frequency of a vibration of a wheel and the output, calculates the frequency at the bottom of the valley part of the output in the frequency region based on the relationship, calculates a ground contact length based on the detected frequency at the bottom of the valley part and the vehicle body speed over the ground, and calculates the air pressure of the tire based on the ground contact length.

2. The tire state judging device according to claim 1, wherein
the control unit performs the frequency-analysis of a low-frequency component of the detection result of the wheel speed sensor to calculate the vehicle speed, calculates a ground contact length from which a vehicle speed component is removed based on the vehicle speed and the frequency at the bottom of the valley part detected in the frequency-analysis of a high-frequency component of the detection result of the wheel speed sensor, and calculates the air pressure of the tire based on the ground contact length.

3. The tire state judging device according to claim 2, wherein
the control unit determines a frequency region of a candidate of the valley part based on the vehicle speed.

4. The tire state judging device according to claim 1, wherein
the control unit calculates the air pressure at set time intervals.

5. The tire state judging device according to claim 1 further comprising:
an informing unit configured to give information of a state of the tire, wherein
the control unit judges the state of the tire based on the calculated air pressure and gives the information by the informing unit when the state of the tire becomes a predetermined state.

6. The tire state judging device according to claim 5, wherein
the control unit outputs a warning from the informing unit when judging that the air pressure is not higher than a threshold value.

7. The tire state judging device according to claim 2, wherein
the control unit calculates the air pressure at set time intervals.

8. The tire state judging device according to claim 3, wherein
the control unit calculates the air pressure at set time intervals.

9. The tire state judging device according to claim 2 further comprising:
an informing unit configured to give information of a state of the tire, wherein
the control unit judges the state of the tire based on the calculated air pressure and gives the information by the informing unit when the state of the tire becomes a predetermined state.

10. The tire state judging device according to claim 3 further comprising:
an informing unit configured to give information of a state of the tire, wherein
the control unit judges the state of the tire based on the calculated air pressure and gives the information by the informing unit when the state of the tire becomes a predetermined state.

11. The tire state judging device according to claim 4 further comprising:
an informing unit configured to give information of a state of the tire, wherein
the control unit judges the state of the tire based on the calculated air pressure and gives the information by the informing unit when the state of the tire becomes a predetermined state.

12. The tire state judging device according to claim 1, wherein the frequency region is determined based on a search center frequency which is calculated by dividing the vehicle body speed over the ground by a reference ground contact length.

\* \* \* \* \*